Oct. 23, 1962     O. H. ZINKE     3,059,749
COIN TESTING APPARATUS Filed Dec. 16, 1959     5 Sheets-Sheet 1

Otto H. Zinke,
Inventor.
Koenig and Pope,
Attorneys.

Oct. 23, 1962 O. H. ZINKE 3,059,749
COIN TESTING APPARATUS
Filed Dec. 16, 1959 5 Sheets-Sheet 2

Otto H. Zinke,
Inventor.
Koenig and Pope,
Attorneys.

FIG. 8.

Oct. 23, 1962     O. H. ZINKE     3,059,749
COIN TESTING APPARATUS
Filed Dec. 16, 1959     5 Sheets-Sheet 4

Otto H. Zinke,
Inventor.
Koenig and Pope,
Attorneys.

Oct. 23, 1962     O. H. ZINKE     3,059,749
COIN TESTING APPARATUS
Filed Dec. 16, 1959     5 Sheets-Sheet 5

United States Patent Office 3,059,749
Patented Oct. 23, 1962

3,059,749
COIN TESTING APPARATUS
Otto H. Zinke, Fayetteville, Ark., assignor to Paradynamics, Incorporated, St. Louis, Mo., a corporation of Missouri
Filed Dec. 16, 1959, Ser. No. 859,867
21 Claims. (Cl. 194—100)

This invention relates to coin testing apparatus, and more particularly to electrical apparatus for detecting spurious or counterfeit coins.

Among the several objects of the invention may be noted the provision of coin testing apparatus which will accept or select only genuine coins and reject slugs and spurious or counterfeit coins; the provision of apparatus of the class described which will not only distinguish between genuine and spurious coins, but which will sort and/or count the genuine coins and reject the spurious coins; the provision of such apparatus which will function to test any one or more denominations of coins, and which will test, count and/or sort the genuine coins of each denomination separately, rapidly and in any random order; the provision of such coin testing apparatus which has sufficient tolerance to accept genuine coins, both new and those which have been greatly worn, and which is highly sensitive to all sorts and types of spurious coins and which will detect and reject them; the provision of such apparatus in which the sensitivity may be precisely and readily adjusted; the provision of apparatus of the class described which will test coins reliably at a high rate of speed and in which it is not necessary to interrupt the free passage of the coin therethrough for accurate testing; the provision of apparatus of the class described which is sensitive to both the effective reactance and resistance of the coin being tested and which requires no electrical contact with the coin tested; the provision of coin testing apparatus which can be conveniently incorporated into coin-operated vending machines; and the provision of such apparatus which is highly reliable in operation, is fail-safe, and is economical both to construct and to operate. Other objects and features will be in part apparent and in part pointed out hereinafter.

The invention accordingly comprises the constructions hereinafter described, the scope of the invention being indicated in the following claims.

In the accompanying drawings, in which several of various possible embodiments of the invention are illustrated.

Corresponding reference characters indicate corresponding parts throughout the several views of the drawings.

Numerous and widely differing approaches have been made to the problem of testing coins to determine their genuineness or spuriousness. The shape, weight, chemical composition, D.C. resistance inductance effect and magnetic properties, among perhaps other characteristics of coins, have all been used as criteria for determining their genuineness. However, these various prior apparatus have various disadvantages and are generally lacking in reliability in consistently rejecting all spurious coins and accepting genuine coins. In accordance with the present invention, apparatus is provided that does operate consistently and reliably not only to test coins, accepting only genuine ones, but will also count and sort coins of different values, rejecting all spurious coins. Moreover, my apparatus also has the advantages set forth in the preceding objects and features of this invention.

In essence the coin testing apparatus of the present invention includes an electrical bridge having at least two reactors (i.e., inductors or capacitors) serially connected in a loop. The bridge input terminals are adapted to be energized from a source of R-F power, such as an oscillator, while one or more of the parameters of the electrical signals at the bridge output terminals are utilized, for example, to control a coin interceptor actuator. A "standard," i.e., typically genuine, coin of a particular denomination is positioned within the field of one of the reactors, while the second reactor is adapted to have various coins passed into and out of its field. In each instance the coins effect a modification in the inductance and resistance of the respective reactors. When, and only when, any of the latter or "test" coins are genuine coins of the same denomination as the standard coin, the signals at the bridge terminals will be balanced or at a substantially null value, and will indicate that the test coin is genuine. This null condition may be used to effect energization of a coin interceptor actuator and physically alter the position of a coin interceptor which otherwise would bar or prevent movement of the test coin into a receiver for genuine coins. The test coin may, if desired, be momentarily held in an arrested position in the field of its reactor, or it may be permitted to fall or move without interruption through this field.

Referring now more particularly to FIGS. 1–7, an oscillator constituting a source of R-F power is indicated at reference character OSC. This oscillator is adapted to impress an R-F potential across input terminals IT1 and IT2 of a detector bridge DB, the latter terminal being connected to ground. Any conventional oscillator circuit may be used to provide an R-F power source with an output frequency in the order of 100 kc. to 10 mc. Preferably the oscillator circuit is one that has a relatively high harmonic content, such as a self-excited oscillator in which the grid is overdriven. A modified Hartley type oscillator is specifically illustrated in FIG. 2 and includes a vacuum tube VT1 with its anode connected to a source of D.C. power, B, and its cathode connected to a tap of a tank coil TC. The screen grid is connected to battery B through a screen grid dropping resistor R1, both this resistor and B being by-passed to provide an R-F path by means of capacitors C1 and C2 respectively. The control grid of VT1 is connected to the top terminal of coil TC through a grid leak constituted by a capacitor C3 and a resistor R2. A variable tank capacitor C4 is shunt-connected across the upper section of tank coil TC while the lower terminal is grounded. The R-F output of OSC is inductively coupled by means of a winding or secondary coil or link LS and a conductor 11 to bridge input terminal IT1. It will be understood that direct or capacitive coupling could be used to transfer this energy to the detector bridge, or that the bridge itself could constitute the tank circuit of the oscillator.

The bridge DB comprises two impedances, capacitors BC1 and BC2 (shunted by trimming capacitors BC1A and BC2A, respectively) serially connected loopwise with two inductors I1 and I2. Each of these inductors comprises a vertical bobbin or coil form CF1 and CF2 respectively (FIGS. 5 and 6) of an insulating high dielectric material, such as a polymerized methacrylate resin having a slot, SL1 and SL2, adapted to receive a coin, and a coil of wire, W1 and W2, wound therearound. Slot SL1 of CF1 constitutes a pocket adapted to receive a standard coin SC of any prescribed denomination within the field of the coil W1 of inductor I1, while slot SL2 constitutes the lower end of an axial coin-receiving passage adapted to guide a test coin TC into and through the field of coil W2 of inductor I2.

The electrical signals produced at output terminals OT1 and OT2 of the bridge DB are inductively coupled by means of conductors 13 and 15 and primary and secondary windings T1P and T1S of an air-core transformer to an amplifier AMP comprising a vacuum tube VT2. It will be noted that these electrical signals include the two parameters of amplitude and phase relationship and may be equal or zero, i.e., balanced or nulled, or unequal and of varying magnitudes. Any electrical potential difference existing between terminals OT1 and OT2 is impressed proportionately across the grid-cathode circuit of VT2 which includes a cathode resistor R3 by-passed by a capacitor C5. The presence of any significant grid excitation by a signal from OT1—OT2 will cause VT2 to conduct and cause an output signal to be developed across load resistor RL. This resistor is interconnected between the anode of VT2 and a D.C. power source B1. The screen grid of VT2 is held at the desired positive potential by a screen grid dropping resistor R4 by-passed by a capacitor C6. The thus amplified R-F signal is coupled via a coupling condenser C7 to the cathode of a diode tube VT3, which is also connected to ground through a resistor R5. A circuit comprising the anode-cathode circuit of diode tube VT3, serially connected with a resistor R6 (by-passed by a capacitor C8), is shunted across resistor R5. The anode of diode VT3 is connected to the second grid of a tetrode gas tube GT1, the cathode of which is grounded. The anode-cathode circuit of GT1 includes the solenoid of a coin interceptor actuator CIA, wires 17 and 19, and a battery B3. The other grid of GT1 is connected at a fixed bias point established by the position of a tap of a variable voltage dividing resistor R7 connected across B3. Diode VT3, gas tube GT1, and their associated components constitute means for energizing or triggering the actuator CIA and comprise an actuator trigger unit AT. A set of electrical contacts comprising a switch SW1 is optionally associated with CIA and may be connected by wires 21 and 23 to control any desired auxiliary electric circuit, for example in an electrically actuated coin-operated vending machine. It will be understood that the cathodes of VT1–VT3 and GT1 may be either of the directly or indirectly heated type and are energized from the customary filament or cathode winding of a transformer (not shown).

The structure of the slug rejector components of the detector bridge and coin interrupter actuator are shown more particularly in FIGS. 3–7. An axial coin receiving and guiding chute, which includes as its lower portion slot SL2, is indicated at reference character P. This vertical axial coin passageway through inductor I2 has a counterbored or flared opening 25 at its lower extremity, the inner edges of which constitute lateral stops for a coin interceptor, gate or detent CI which has its upper end projecting upwardly into this opening. Interceptor CI comprises an extension or arm of a pivoted relay armature AR of coin interceptor actuator CIA. The actuating coil for this relay armature AR is indicated at ARC, and when energized by conduction of gas tube GT1 will pull in armature AR and move the upper end of CI to the left dashed line position illustrated in FIG. 6. In the event the coin TC tested is a slug or is spurious, relay coil AR is not energized and the coin interceptor remains centered (as shown in solid lines in FIG. 6), thus barring further movement of coin TC through the chute. Two similar coin receiving chutes GC and BC are positioned below and slightly laterally offset in relation to opening 25. These two chutes comprise inclined channels and are formed, for example, from metallic sheet, and have an upturned lip along one upper edge and a flange along the other adapted to be secured to the undersurface of a bracket 27 which in turn is affixed to a panel 29. These two chutes are mounted so that the channels diverge and the bottom or discharge ends are separated. Thus, if a particular test coin TC is genuine it will fall freely into chute GC, interceptor CI having been moved to the left by energization of CIA. The coin can then be caught in any convenient receptacle (not shown) or be used to actuate the mechanism of a coin-operated vending machine. On the other hand, if a particular coin TC is spurious it is blocked by interceptor CI and can be removed from the field of inductor I2 only by manual operation of a spring-return push rod PR which includes a pin 31 extending laterally from PR and adapted to move interceptor CI to the right (as shown in the second dashed line position of FIG. 6). This frees the spurious coin and causes it to drop into the left chute BC which discharges the coin into a second receptacle (not shown) or the coin return passage of a vending machine. It will be understood that push rod PR may be omitted, in which case the coin interceptor would merely be physically adjusted to maintain a normal position at the right of opening 25 (as shown in the second dashed line position of FIG. 6), and would move to the other dashed line position only when the relay coil ARC of CIA was energized as a result of passage of a good coin through I2. This would provide an automatic return for bad coins.

Operation of this embodiment of the present invention is as follows. A first "standard" or typical genuine coin of any desired denomination is inserted in the pocket or recess formed by slot SL1 of inductor I1 and a second similar genuine coin is inserted in the test passage P so as to be similarly positioned within the field of inductor I2. The frequency of the oscillator OSC may be adjusted to any preselected frequency by variation of capacitor C4. It will be noted that the sensitivity of this coin testing apparatus is to some extent a function of the oscillator frequency. The higher the frequency, say in the order of 10 m.c., the higher the apparent definition of the test coin, i.e., the testing apparatus appears to be more sensitive to variations in surface characteristics of the coins at higher frequencies. The capacitive values of the impedances BC1, BC2 are then adjusted by trimming or varying the trimmer capacitors BC1A and BC2A so that the detector bridge DB is balanced. For more flexibility in balancing and adjusting of DB, an auxiliary trimmer capacitor CT may be shunt-connected across one of the inductors, such as shown in relation to I1. The balancing or nulling of the signals at OT1 and OT2 is evidenced by actuation of coin interceptor CI. More specifically, when the amplitude parameters of the two signals present at OT1 and OT2 are balanced or nulled, there will be no signal impressed on the grid of VT2 and no output signal developed across load resistor RL. Thus, condenser C8 will not be charged and diode VT3 will not conduct. The voltage on the second or alternate control grid of GT1 is thereby raised to a sufficiently positive potential to cause firing or conduction of GT1 which energizes coil ARC and pulls in relay armature AR, thus moving the upper end of CI to the left, releasing the good test coin TC and permitting it to fall in the "accept" chute GC. As soon as the coin leaves SL2 the bridge DB again becomes unbalanced and the grid of VT1 is driven by the net or composite of the electrical signals produced at terminals OT1 and OT2. The potential thereby developed across RL causes charging of capacitor C8 and diode VT3 will conduct. As the anode of VT3 is tied or connected directly to the second grid of GT1 it will move the potential of this grid in a negative direction relative to its cathode and prevent conduction. Relay coil ARC thus is maintained deenergized as long as there is any significant imbalance of the bridge DB. In order to obtain a bridge null or balance, a test coin of the same denomination (and genuine) must be dropped in the coin testing passage P and move through the field of I2. A nongenuine coin will effect an inductance and resistance change in the value of I2 which will not match those of I1, and thereby prevent nulling of the bridge. Additional sensitivity adjustment for this apparatus is provided by variation of the slider of R7 which sets the bias level of the other grid of GT1 relative to its cathode.

Figure 11:
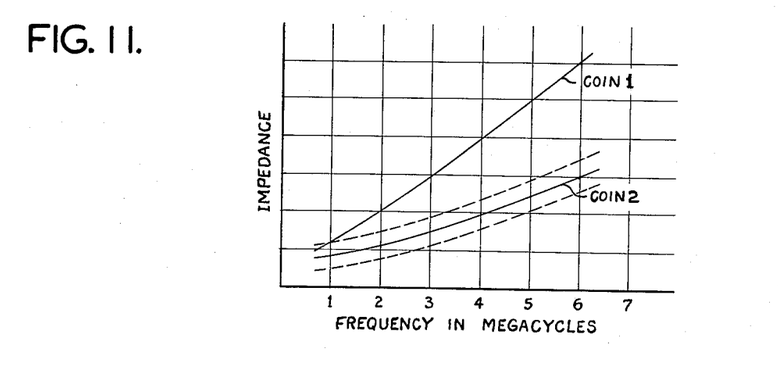
FIG. 11 is a graph illustrating representative impedance effects of a spurious and a genuine coin as a function of the harmonic content of the R-F power source.

The selectivity of the detector bridge in distinguishing spurious coins from genuine ones is to some extent a function of the harmonic content of the R-F output of the oscillator. The impedance of each of the inductors I1 and I2 with their respective coins SC1 and TC in their fields, is a function of frequency of the power source connected to input terminals IT1 and IT2. If the output of oscillator OSC were relatively purely sinusodial the R-F power could be concentrated at the fundamental frequency, whereas if the oscillator grid is overdriven the output will have a substantial portion of the R-F power present in, for example, the second, fourth and sixth harmonics of the fundamental frequency. It is possible that a substantial bridge balance could be obtained if the oscillator provided a source of power at simply the fundamental frequency, which would effect a particular and single reactance and resistance change in each of the coin-inductor legs of bridge DB. By exciting or driving bridge DB with a high harmonic content power source there are complex and composite reactance and resistance changes effected in each of the coin-inductor bridge legs. The chances of the effect of a spurious coin matching that of a genuine coin are sharply decreased as the harmonic content increases. This is demonstrated graphically in FIG. 11 where the respective impedances of an inductor with coin 1 (spurious) and coin 2 (genuine) in its field versus the frequency in megacycles of oscillator frequency are comparatively plotted representatively. The dashed-line curves parallel to the coin 2 curve represent exemplary tolerance limits of the coint testing apparatus of the present invention. Assuming first that the oscillator is tuned to a fundamental frequency of 1 megacyle, it will be noted that the impedance of spurious coin 1 and the inductor falls within the limits of the impedance of genuine coin 2 and the inductor. Thus the detector bridge would be sufficiently balanced to actuate the actuator CIA and pass both coins 1 and 2 if there is no substantial harmonic content in the oscillator output. Assuming, however, that there are relatively strong harmonics present in the oscillator output at 2, 4 and 6 megacycles, the impedance of the inductor will be substantially greater at 2, 4 and 6 megacycles with coin 1 in its field than with coin 2, and the curve for coin 1 which falls well outside the tolerance limits at these higher frequencies illustrates that the effective impedance of the composite coin 1 and inductor assembly is quite distinguishable from that of the coin 2 inductor assembly, and will further increase the bridge selectivity.

It will be noted that the embodiment described uses a rather quick-acting relay to actuate coin interceptor CI so that a free-falling genuine coin is not intercepted in its course through the field of I2. A slower acting relay may be used as a component of CIA so that the actuation of CI with a good test coin does not occur until after coin TC is held fixed or positioned momentarily in the field of I2. If such a slower acting actuator CIA is utilized it will also be understood that any combination of coins SC can be placed in SL1 of inductor I1 and interceptor CI will remain in its centered position until an equal number and denomination of genuine test coins TC are present in the field of I2.

Figure 1:
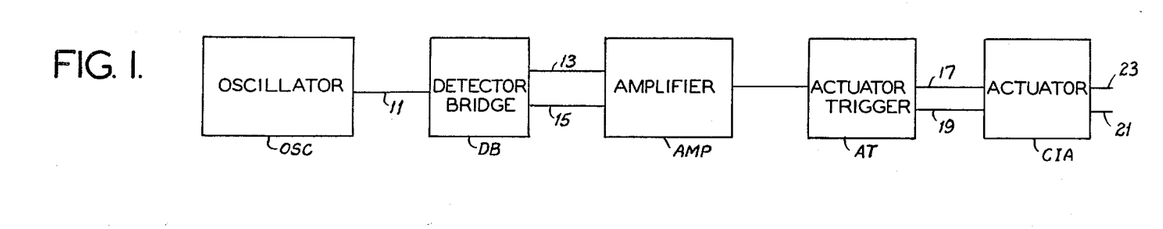
FIG. 1 is a block diagram of one embodiment of coin testing apparatus of the present invention.
Figure 2:
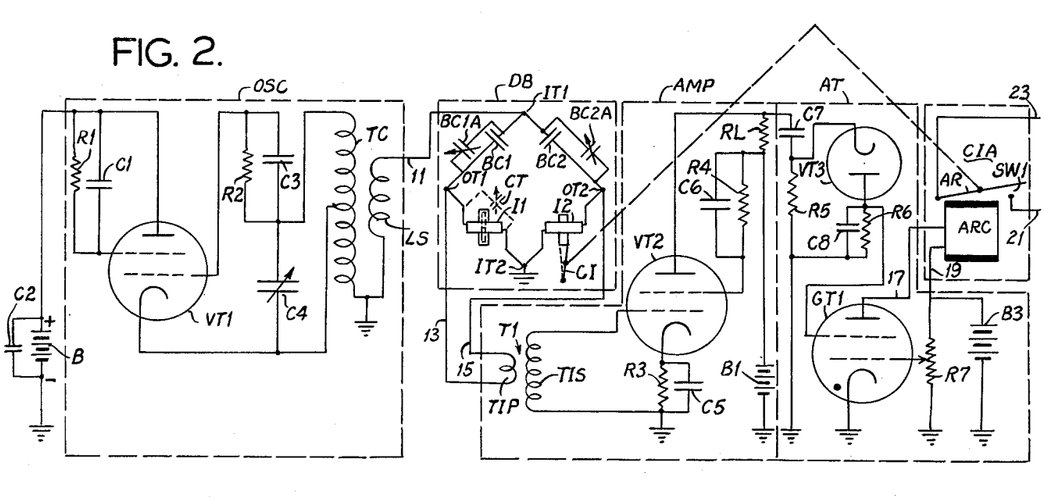
FIG. 2 is a schematic circuit diagram of the apparatus of FIG. 1.
Figure 3:
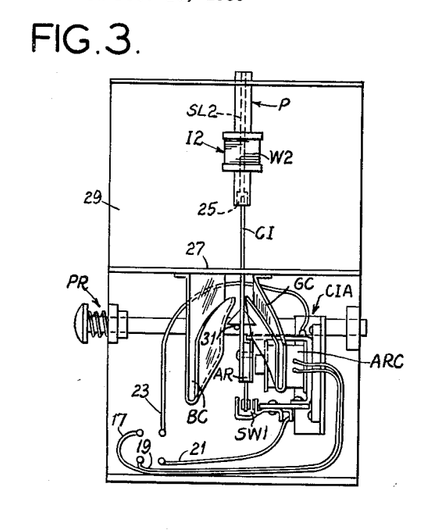
FIG. 3 is a view in elevation of a portion of the detector bridge, coin passage, coin interceptor and coin-interceptor actuator components of the apparatus of FIGS. 1 and 2.
Figure 4:
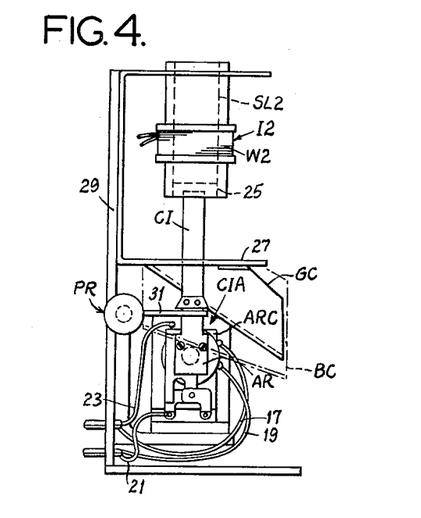
FIG. 4 is a view in elevation of the structure shown in FIG. 3 when viewed from the left.
Figure 5:
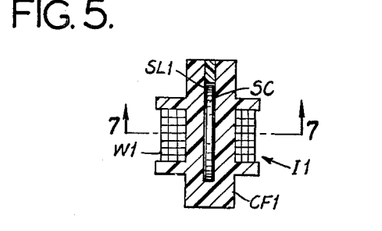
FIG. 5 is a view in cross section of one of the inductor legs (including a "standard" coin) of the detector bridge portion of the apparatus of FIGS. 1–4.
Figure 6:
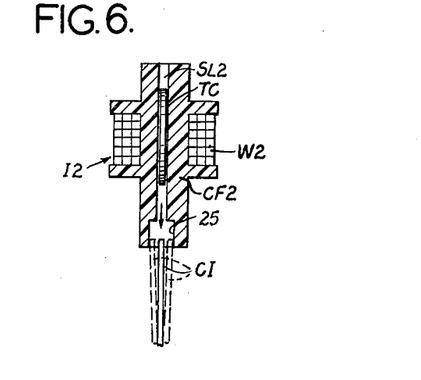
FIG. 6 is a view in cross section of the other inductor leg and associated components (including a coin to be tested) of the FIGS. 1–4 apparatus.
Figure 7:
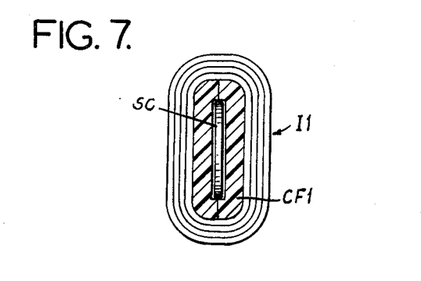
FIG. 7 is a horizontal cross section taken on line 7—7 of FIG. 5.
Figure 8:
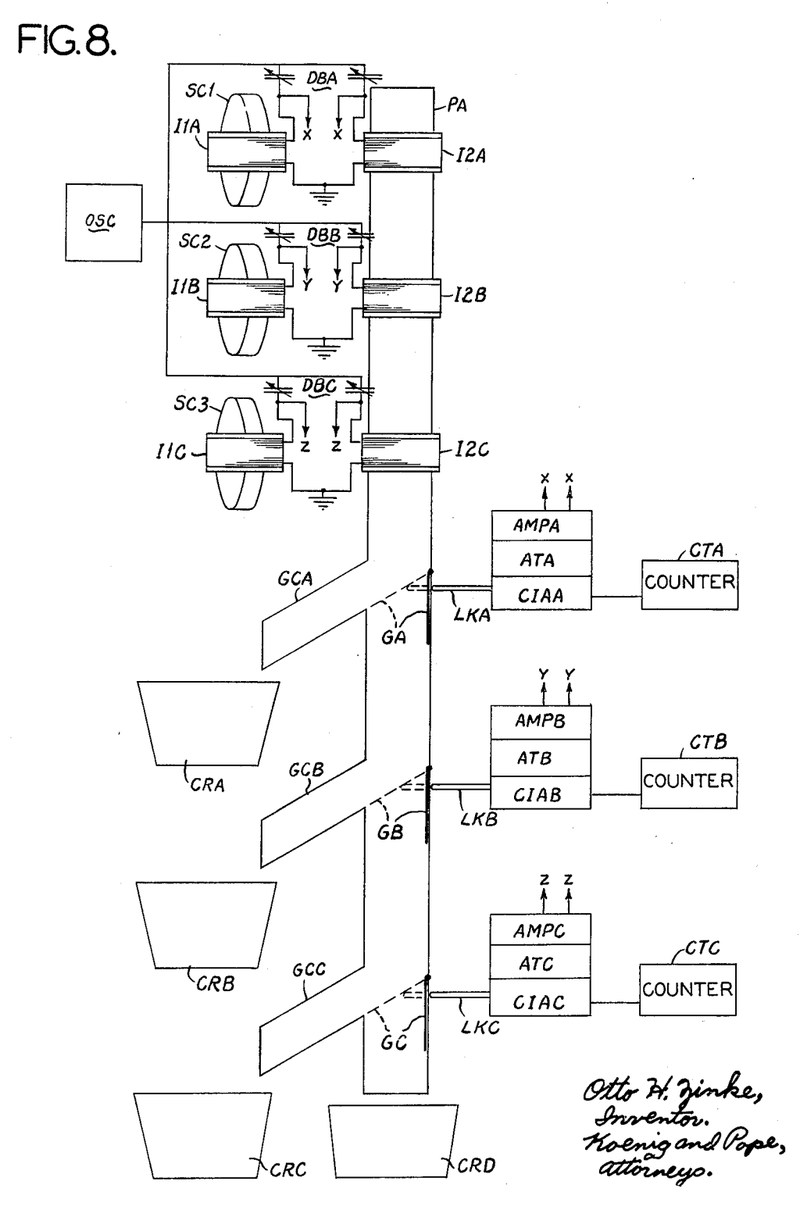
FIG. 8 is a schematic view of coin testing, sorting and counting apparatus of the present invention.

A further embodiment of the present invention is represented by the coin testing, sorting and counting apparatus illustrated in FIG. 8. The single source of radio frequency power OSC is connected to drive or energize three detector bridges DBA, DBB and DBC, connected electrically in parallel. It will be understood that a separate oscillator could be utilized for each individual detector bridge. A "standard" nickel SC1 is positioned in the field of one of the inductors I1A of the first bridge DBA and the capacitor impedance legs of DBA are initially adjusted as noted above with a second genuine nickel held in the field of inductor I2A. Similarly a "standard" dime SC2 and a "standard" quarter SC3 are respectively positioned in inductors I1B and I1C, the bridges DBB and DBC being balanced as noted above in regard to DBA, but with a genuine dime and quarter held respectively in the fields of I2B and I2C. Inductors I2A, I2B and I2C are spaced apart one below the other and surrounding the axis of a test coin passageway PA. The output terminals of each of the bridges are respectively connected as indicated at X—X, Y—Y and Z—Z to the input terminals of three similar amplifiers AMPA, AMPB and AMPC, each of which has the same circuitry as described above in regard to AMP. Each of these three separate amplifiers has an actuator trigger (ATA, ATB, ATC) and a coin interceptor actuator (CIAA, CIAB and CIAC) associated and interconnected to it. Passageway PA has three branch chutes, GCA, GCB and GCC, adapted to receive only genuine nickels, dimes and quarters respectively. Positioned along coin passage PA are spaced three deflectors or gates GA, GB, GC, normally positioned as shown in solid lines and generally opposite the entries of each of the branch chutes GCA, GCB and GCC, respectively. These three deflectors are adapted for actuation to their dashed line positions by CIAA, CIAB and CIAC and three mechanical linkages LKA, LKB and LKC, each respectively responsive to a transitory balance or null of bridges DBA, DBB or DBC, respectively. The number of times each of these three actuators operates is individually recorded and indicated by respective counters CTA, CTB and CTC of any of the conventional types of counting devices which are advanced one digit for each mechanical actuation of a control arm. A coin receiver CRA is located at the exit end of branch chute GCA to receive genuine nickels, while similar receivers CRB and CRC are positioned below the outlet ends of branch chutes GCB and GCC to to receive genuine dimes and quarters. A receiver CRD for spurious coins and slugs is placed below the lower or exit end of test coin passage PA and will receive all coins not deflected into the three branch coin receiving chutes.

The operation of this coin testing, sorting and counting apparatus is as follows. Any assorted group of nickels, dimes, quarters, slugs, etc., is placed in a hopper (not shown) above the upper end of PA and the coins are permitted to drop into PA in any random order. Any genuine nickel will effect a null or balance of bridge DBA and cause actuation of linkage LKA by actuator CIAA. This will move deflector GA to the dashed line position so as to discharge the nickel into receiver CRA. Concurrently counter CTA is energized to indicate and record the addition of this nickel to the nickel receiver CRA. Quarters and dimes if genuine similarly will cause actuation of LKC and LKB (and counters CTC and CTB), and thus be deflected into receivers CRC and CRB, respectively. Any spurious coin will fail to modify the inductance and resistance of inductors I2A, I2B or I2C to effect a bridge balance and so none of the deflectors LKA, LKB and LKC will be actuated. Thus, the spurious test coins are not interrupted or deflected and accumulate in receiver CRD.

Figure 9:
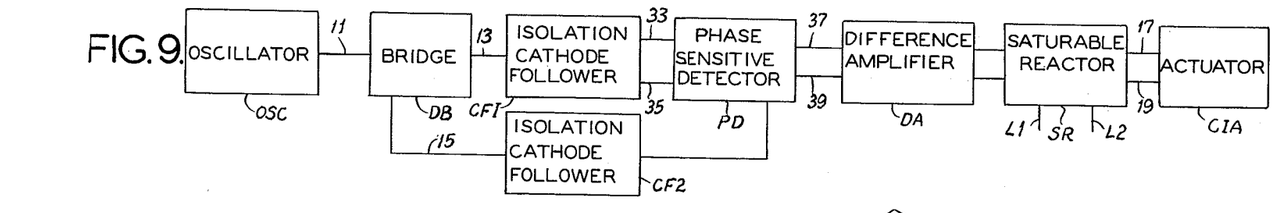
FIGS. 9 and 10 are, respectively, block and schematic circuit diagrams of another embodiment of coin testing apparatus of the present invention.
Figure 10:
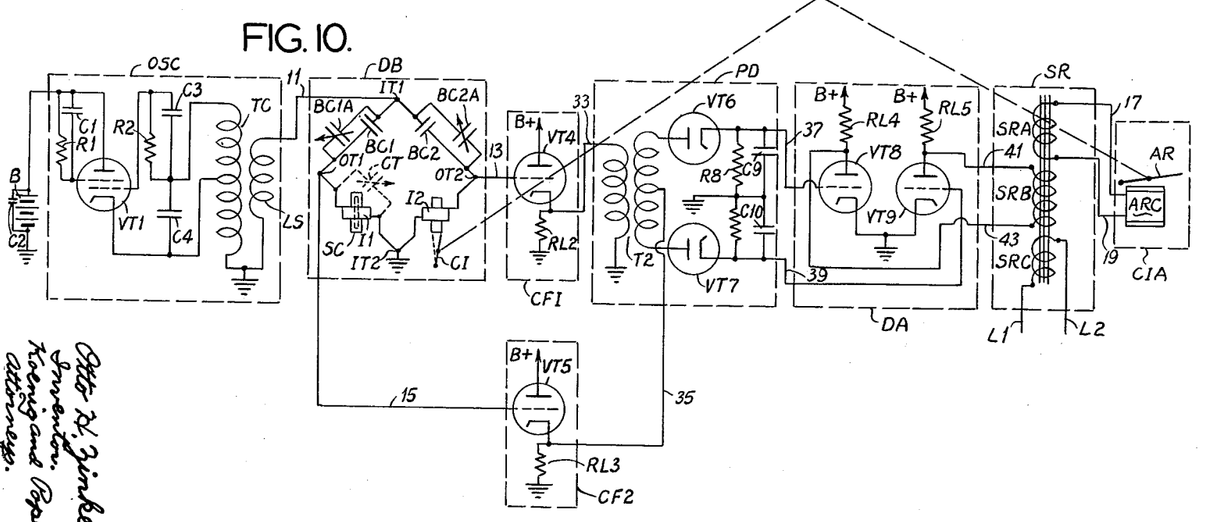

The preceding coin testing apparatus is particularly sensitive to any imbalance in the amplitude parameters of the electrical signals at the output terminals of the detector bridge. However it is remotely conceivable that a coin may affect the inductance and resistance of N2 in such a way that a compensating effect on the amplitude parameter of the signal of OT2 results. Thus, in isolated instances a spurious coin or slug may effect an apparent amplitude balance in the OT1 and OT2 signals. Although this is highly unlikely, a further coin testing apparatus embodiment is provided, as illustrated in FIGS. 9 and 10. This apparatus is particularly sensitive to any phase differences between the OT1 and OT2 signals, although it is also sensitive to amplitude parameter differences in these signals. The oscillator OSC and detector bridge DB components of this embodiment are identical to those in FIGS. 1-7. However, instead of the conductors 13 and 15 applying a net or composite of the signals at OT1 and OT2 to the opposite ends of a coupling transformer, they are separately connected to the control grids of two triode vacuum tubes VT4 and VT5, respectively, each connected in a cathode follower circuit as indicated at CF1 and CF2. The cathode followers each include a load resistor RL2 and RL3 in their anode-cathode circuit, the anodes being connected to any convenient source of D.C. power as indicated at B+. The output conductors 33 and 35 of these two isolation stages are connected to circuit junctions in a phase-sensitive detector or phase discriminator circuit PD. Conductor 33 is interconnected to one terminal of the primary winding of an R-F transformer T2, while conductor 35 is connected to the center tap of secondary winding of T2. The other terminal of the primary is grounded while the remaining two terminals of the secondary are connected to the anodes of two diodes VT6 and VT7. The cathodes of these tubes are connected to the control grids of two triode tubes VT8 and VT9, incorporated in a difference amplifier DA, by means of two wires 37 and 39. A center-tapped resistor R8, with its mid-tap grounded, interconnects the cathodes of VT6 and VT7, each of these resistors being shunted by identical capacitors C9 and C10. Any difference as to the phase or amplitude parameters of the signals present on wires 33 and 35 (and therefore conductors 13 and 15) will cause an imbalance in the potential levels of the VT6 and VT7 cathodes, and thereby impress a D.C. potential across wires 37 and 39. Such a D.C. potential when applied to the grids of VT8 and VT9 will cause a potential difference at the anodes of these tubes. The conduction through load resistor RL4 will differ from that through RL5 and current will be caused to flow via wires 41 and 43 in a control winding SRB of a saturable reactor SR. The anodes of VT8 and VT9 are also connected to any convenient source of D.C. power as indicated at B+. The filaments or cathodes of all the tubes, as noted in regard to the other embodiment, are energized by the customary filament heating transformer(s).

Saturable reactor SR also includes, besides its core and D.C. control winding SRB, two additional windings SRA and SRC. The former is connected via wires 17 and 19 to the relay coil ARC of the coin interceptor actuator, while the latter is connected to a source of A.C. power. When the coil SRB is energized, the core of SR is substantially saturated and there is insufficient inductive coupling between windings SRC and SRA to produce a potential of sufficient amplitude to energize ARC. Saturable reactor SR functions in this embodiment as an actuator trigger unit.

The operation of this FIGS. 9 and 10 embodiment is quite similar to that of the earlier embodiments. However, as the phase sensitive detector PD is sensitive to phase as well as to amplitude differences between the OT1 and OT2 signals, even the unlikely possibility of an isolated spurious coin causing an apparent bridge balance or null is avoided.

Figure 12:
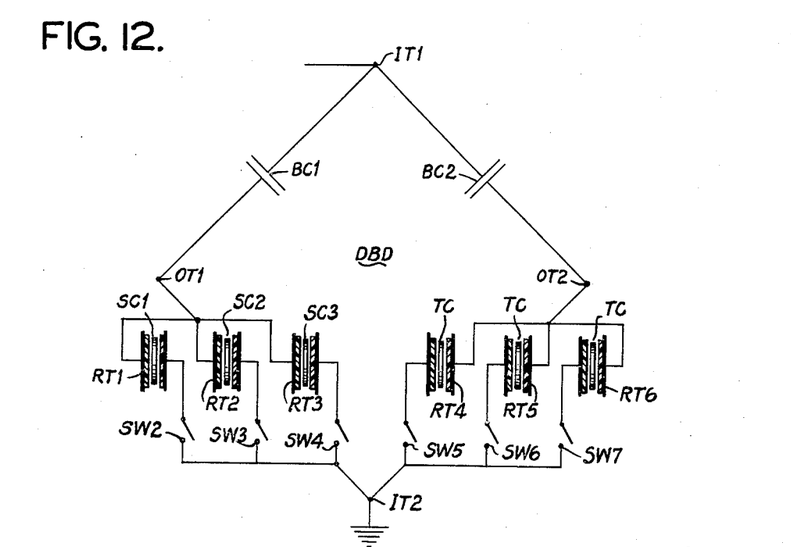
FIG. 12 is a schematic diagram of a modified detector bridge component of this invention.

A modified detector bridge DBD is illustrated in FIG. 12. This bridge is similar to DB except that the reactors or inductors I1 and I2 are each replaced by a reactance means comprising at least two shunt-connected reactors. DBD includes three capacitive reactors RT1, RT2 and RT3 adapted to be singly or jointly shunt-connected to constitute reactance means as one leg of the detector bridge. Three identical capacitive reactors RT4, RT5 and RT6 are similarly connected to constitute another leg of the bridge; the other two legs of the bridge DBD comprise capacitors BC1 and BC2. Associated and serially connected with each of the reactors RT1-RT6 are six single-pole single-throw switches SW2-SW7. Each of these six capacitors is formed from two parallel, spaced-apart, metal plates with their opposing faces coated with a layer of insulation material. The plate spacing is sufficient to accommodate the thickness of a coin and a standard nickel SC1, a standard dime SC2 and a standard quarter SC3 are so positioned between the pairs of plates (and therefore in the respective fields) of the three capacitive reactors RT1, RT2 and RT3. The other leg reactors RT4-RT6 are respectively adapted to receive separate test coins TC. Assuming that this detector bridge is incorporated in a coin testing apparatus comprising part of a vending machine having at least one article priced at 15¢, switches SW2, SW3, SW5 and SW6 are moved to closed positions. A bridge balance will be obtained only when a genuine nickel is placed in the field of RT4 and a genuine dime is placed in the field of RT5. By using various combinations of matching switch positions of SW2-SW4 and SW5-SW7 many various coin totals can be established. The switches SW2-SW7 may be either paired or ganged, if desired.

It is to be understood that impedances other than capacitors may be used in two of the detector bridge legs. For example, resistors, inductors or combinations of these and capacitors may be utilized. It will also be noted that the embodiments disclosed herein incorporate fail-safe circuitry, i.e., any failure of a diode or a gas-rectifier such as GT1, etc., will not effect an energization of ARC and thus actuate CIA to pass a spurious coin. However, although usually less desirable, nonfail-safe circuitry may be used and is within the scope of this invention.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

I claim:
1. Coin testing apparatus comprising an electrical bridge including two reactors loop-connected with two capacitors and having input terminals and output terminals, a source of R-F power having a substantial harmonic content adapted to be connected to said input ter- minals and impress an electrical potential thereacross, the first of said reactors adapted to have a genuine coin positioned in the field thereof and thereby effect a modification in the reactance and resistance of said reactor, means for moving a second coin into the field of the second of said reactors thereby to effect a modification in the reactance and resistance of said second reactor, and means responsive to the electrical signals developed at said output terminals whereby a balance of said signals indicates said second coin is genuine and an imbalance of said signals indicates said second coin is spurious.

2. Coin testing apparatus as set forth in claim 1 in which said two reactors are inductors and said R-F power source has an output frequency of at least approximately 100 kc.

3. Coin testing apparatus comprising an electrical bridge including two inductors loop-connected with two capacitors and having input terminals and output terminals, a source of R-F power having a substantial harmonic content adapted to be connected to said input terminals and impress an electrical potential thereacross, the first of said inductors adapted to have a genuine coin positioned in the field thereof and thereby effect a modification in the inductance and resistance of said inductor, a coin receiving passage for moving a second coin into the field of the second of said inductors thereby to effect a modification in the inductance and resistance of said second inductor, first means associated with said passage and adapted to receive only spurious coins, second means associated with said passage and adapted to receive only genuine coins, a coin interceptor adapted only when actuated to pass said second coin into said second means, and a coin interceptor actuator means responsive to at least one parameter of the electrical signals developed at said output terminals whereby when said second coin is genuine the signals are substantially balanced and said actuator means is energized and when said second coin is spurious said actuator means is not energized.

4. Coin testing apparatus as set forth in claim 3 in which said coin interceptor actuator means includes an electronic circuit responsive to the amplitude parameter of said electrical signals.

5. Coin testing apparatus as set forth in claim 3 in which said coin interceptor actuator means includes an electronic circuit responsive to the phase parameter of said electrical signals.

6. Coin testing apparatus as set forth in claim 3 in which said coin interceptor actuator means includes an electronic circuit responsive both to said amplitude and phase parameters of said electrical signals, and whereby only when said second coin is genuine the two parameters of said electrical signals are balanced and said coin actuator means is energized and when said second coin is spurious at least one parameter of said signal is unbalanced and said actuator means is not energized.

7. Coin testing apparatus as set forth in claim 3 in which said two capacitors have equal capacitances.

8. Coin testing apparatus as set forth in claim 3 which further includes two additional capacitors each respectively electrically connected with one of said two capacitors, at least one of said additional capacitors being adjustable.

9. Coin testing apparatus as set forth in claim 3 in which said source of R-F power comprises a variable frequency oscillator adapted to generate R-F energy having an output frequency of at least 100 kc.

10. Coin testing apparatus as set forth in claim 3 in which said coin actuator means comprises an electromagnetic actuator.

11. Coin testing apparatus as set forth in claim 4 in which said electronic circuit includes a transducer responsive to a null voltage at said output terminals to energize said actuator means.

12. Coin testing apparatus as set forth in claim 5 in which said electronic circuit includes a phase discriminator responsive to any phase differences between said electrical signals at said bridge output terminals to energize said actuator means.

13. Coin testing apparatus as set forth in claim 6 in which said electronic circuit includes a phase discriminator responsive both to any phase and amplitude differences between said electrical signals at said bridge output terminals to energize said actuator means.

14. Coin testing and sorting apparatus comprising a plurality of electrical bridges each bridge including two inductors loop-connected with two impedances and having input terminals and output terminals, a source of R-F power adapted to be connected to said input terminals and impress an electrical potential thereacross, each of the first of said inductors in each bridge adapted to have a genuine coin of a different denomination positioned in the field thereof and thereby effect a modification in the inductance and resistance of its respective inductor, a coin receiving passage for moving a plurality of spurious and genuine coins of different denominations sequentially through the respective fields of at least one of said second inductors thereby to effect a transitory modification in the inductance and resistance of said second inductor, first means associated with said passage and adapted to receive only spurious coins of said different denominations, a separate coin interceptor associated with each of said second inductors, a separate receiver associated with each of said coin interceptors, each receiver adapted to receive only genuine coins of a preselected different one of said denominations, each coin interceptor adapted only when actuated to pass a test coin of a preselected one of said denominations into its respective receiver, and a separate coin interceptor actuator means associated with each coin interceptor and responsive to at least one parameter of the electrical signals developed at the output terminals of its respective bridge whereby only when said coin is genuine and of the proper denomination will the signals of said one bridge be substantially balanced and its respective actuator means be energized.

15. Coin testing and sorting apparatus as set forth in claim 14 which further includes a separate counter means associated with each coin interceptor whereby the number of genuine coins of each denomination are individually counted.

16. Coin testing apparatus comprising an electrical bridge including two reactance means loop-connected with two capacitors and having input terminals and output terminals, a source of R-F power having a substantial harmonic content adapted to be connected to said input terminals and impress an electrical potential thereacross, each of said reactance means comprising at least two shunt-connected reactors, the two reactors of the first of said reactance means each adapted to have a genuine coin positioned in the field thereof and thereby effect a modification in the reactances and resistances of their respective reactors, means for moving coins to be tested into the respective fields of the reactors constituting the second of said reactance means thereby to effect a modification in the reactances and resistances of said second reactors, and means responsive to at least one parameter of the electrical signals developed at said output terminals whereby a balance of said signals indicates said test coins are genuine and of the same respective denominations as said genuine coins positioned in the fields of the first reactance means.

17. Coin testing apparatus as set forth in claim 16 in which said genuine coins positioned in the fields of the first reactance means are of different denominations.

18. Coin testing apparatus as set forth in claim 17 in which said reactors are inductors.

19. Coin testing apparatus as set forth in claim 18 in which said capacitors have equal capacitances.

20. Coin testing apparatus as set forth in claim 19 in which said source of R-F power comprises a variable frequency oscillator adapted to generate R-F energy having an output frequency of at least 100 kc.

21. Coin testing apparatus comprising an electrical bridge including two reactors loop-connected with two capacitors and having input terminals and output terminals, said bridge constituting the tank circuit of an oscillator and adapted to generate R-F power having a substantial harmonic content and impress an R-F potential across said bridge input terminals, the first of said reactors adapted to have a genuine coin positioned in the field thereof and thereby effect a modification in the reactance and resistance of said reactor, means for moving a second coin into the field of the second of said reactors thereby to effect a modification in the reactance and resistance of said second reactor, and means responsive to the electrical signals developed at said output terminals whereby a balance of said signals indicates said second coin is genuine and an imbalance of said signals indicates said second coin is spurious.

References Cited in the file of this patent
FOREIGN PATENTS 455,362   Great Britain __________ Nov. 19, 1936